US008949676B2

(12) United States Patent
Behrendt et al.

(10) Patent No.: US 8,949,676 B2
(45) Date of Patent: Feb. 3, 2015

(54) REAL-TIME EVENT STORM DETECTION IN A CLOUD ENVIRONMENT

(75) Inventors: Michael Man Behrendt, Randersacker (DE); Rafah A. Hosn, New York, NY (US); Ruchi Mahindru, Elmsford, NY (US); Harigovind V. Ramasamy, Ossining, NY (US); Soumitra Sarkar, Cary, NC (US); Mahesh Viswanathan, Yorktown Heights, NY (US); Norbert G. Vogl, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 13/469,468

(22) Filed: May 11, 2012

(65) Prior Publication Data
US 2013/0305080 A1 Nov. 14, 2013

(51) Int. Cl.
*G06F 11/34* (2006.01)
(52) U.S. Cl.
USPC ............. 714/43; 714/4.1; 714/25; 726/22
(58) Field of Classification Search
USPC .............. 714/4.1, 4.5, 25, 43; 726/23, 24; 709/221, 223, 224
See application file for complete search history.

(56) References Cited

U.S. PATENT DOCUMENTS

| | | | |
|---|---|---|---|
| 6,173,207 B1 | 1/2001 | Eidson | |
| 6,604,208 B1 * | 8/2003 | Gosselin et al. | 714/4.12 |
| 7,062,683 B2 * | 6/2006 | Warpenburg et al. | 714/43 |
| 7,213,179 B2 | 5/2007 | Song et al | |
| 7,269,824 B2 | 9/2007 | Noy et al. | |
| 7,350,007 B2 | 3/2008 | Depew et al. | |
| 7,463,590 B2 * | 12/2008 | Mualem et al. | 370/241 |
| 7,523,349 B2 | 4/2009 | Barras | |
| 7,523,355 B2 | 4/2009 | Huang et al. | |
| 7,526,685 B2 | 4/2009 | Noy et al. | |
| 7,650,403 B2 | 1/2010 | Koetke et al. | |
| 7,774,458 B2 | 8/2010 | Trinon et al. | |
| 7,792,036 B2 * | 9/2010 | Clemm et al. | 370/235 |
| 8,339,974 B1 * | 12/2012 | Dawson et al. | 370/252 |
| 8,638,680 B2 * | 1/2014 | Sen et al. | 370/252 |
| 8,737,231 B2 * | 5/2014 | Carey et al. | 370/237 |
| 8,763,127 B2 * | 6/2014 | Yao et al. | 726/24 |
| 2002/0152185 A1 * | 10/2002 | Satish Jamadagni | 706/1 |
| 2005/0096953 A1 * | 5/2005 | Washington et al. | 705/7 |

(Continued)

FOREIGN PATENT DOCUMENTS

GB 2452025 A * 2/2009

OTHER PUBLICATIONS

Wikipedia's Linear Regression version from Apr. 10, 2012 http://en.wikipedia.org/w/index.php?title=Linear_regression&oldid=486604844.*

(Continued)

*Primary Examiner* — Joseph Schell
(74) *Attorney, Agent, or Firm* — Ryan, Mason & Lewis, LLP (57) ABSTRACT

A method, an apparatus and an article of manufacture for detecting an event storm in a networked environment. The method includes receiving a plurality of events via a plurality of probes in a networked environment, each of the plurality of probes monitoring a monitored information technology (IT) element, aggregating the plurality of events received into an event set, and correlating the plurality of events in the event set to determine whether the plurality of events are part of an event storm by determining if the plurality of events in the event set meet one or more event storm criteria.

18 Claims, 7 Drawing Sheets

(56) References Cited

U.S. PATENT DOCUMENTS

| | | |
|---|---|---|
| 2005/0198640 A1 | 9/2005 | Uthe |
| 2010/0332494 A1 | 12/2010 | Graefe |
| 2011/0078301 A1* | 3/2011 | Dehaan et al. ............ 709/224 |
| 2011/0119029 A1 | 5/2011 | Marvasti et al. |
| 2011/0196964 A1* | 8/2011 | Natarajan et al. ............ 709/224 |
| 2012/0023041 A1* | 1/2012 | Kariv et al. ............ 706/12 |
| 2012/0144020 A1* | 6/2012 | Carey et al. ............ 709/224 |

OTHER PUBLICATIONS

Event Storm Detection and Identification in Communication Systems by Albaghadadi, Briley and Evens published by Science Direct Jun. 27, 2005.*

Albaghdadi et al., Event Storm Detection and Identification in Communication Systems, 2006, Reliability Engineering and System Safety, 91 (5), pp. 602-613.

Castelli et al., Proactive Management of Software Aging, IBM J. Res. & Dev. vol. 45 No. 2 Mar. 2001.

* cited by examiner

REAL-TIME EVENT STORM DETECTION IN A CLOUD ENVIRONMENT

FIELD OF THE INVENTION

Embodiments of the invention generally relate to information technology (IT), and, more particularly, to Cloud computing.

BACKGROUND

An event is an output of a failure detection system to convey the occurrence of an error. Typically, system parameters of a monitored system are sampled periodically by a sensing agent. This can include, by way of example, the number of pages paged in or out since the last reboot available in Linux via the "proc" file system, consecutive values read X seconds apart used to compute the paging (in or out) rate, etc.

A post-processing rule can be defined on the basis of querying the sensing agent periodically. Such a rule can be, for example, a check of the sustained paging rate over a sequence of queries to see if it exceeds a threshold. A problem event is generated if the rule evaluates to TRUE. By way of example, the rule "≥400 pages/second for 5 consecutive queries," if evaluated to TRUE, would result in a "SYSTEM_THRASHING" event. A resolved event is generated (the problem subsides) if a previously TRUE rule evaluates to FALSE.

An action is defined herein as the corrective steps taken by an autonomic system to resolve a failure reported on an IT element. Event storms are the manifestation of an important class of abnormal behaviors in distributed systems. They occur when a large number of nodes throughout the system generate a set of events within a small period of time. By way of example and illustration, let $M=\{m_1, m_2, \ldots, m_n\}$ be the set of monitoring component types in an environment, and let $X=\{x_1, x_2, \ldots, x_m\}$ be the set of IT elements being monitored by a subset of M.

One or more monitoring systems may be configured to alert for the same event or failure. Let $F=\{f_1, f_2 \ldots f_p\}$ be the set of errors or failures types. Also, monitoring component $m_t$ can generate event $e^j{}_k$ upon detection of error or failure $f_j$. Let $e^j{}_k$ be an event indicating a failure of type $f_j$ on IT element $x_k$, where $e^j{}_k=1$ (if failure is reported) or 0 (if failure has been resolved). Let $A=\{a1, a2 \ldots ao\}$ be the set of actions taken on the monitored end points to resolve an error.

However, given the occurrence of an event storm in a distributed system, challenges exist in responding to the event storm in real-time, at a level higher than that of individual failures, so as to have reduced interference in the system.

SUMMARY

In one aspect of the present invention, techniques for real-time event storm detection in a cloud environment are provided. An exemplary computer-implemented method for detecting an event storm in a networked environment can include steps of receiving a plurality of events via a plurality of probes in a networked environment, each of the plurality of probes monitoring a monitored information technology (IT) element, aggregating the plurality of events received into an event set, and correlating the plurality of events in the event set to determine whether the plurality of events are part of an event storm by determining if the plurality of events in the event set meet one or more event storm criteria.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes real-time event storm detection in a cloud environment. An event storm of Type 1 is defined as $\{e^j{}_k\}$ being generated on a large number of systems by monitoring components $m_t$ indicating the same failure $f_j$. An event storm of Type 2 is defined as $\{e^j{}_k\}$ being generated on all of the systems by monitoring components $m_t$ indicating a set of failures, where $\{f_j\} \cup F$. Additionally, as used herein, a "cell" refers to a subset of a physical data center that is managed by an (optionally autonomic) management system.

A type 1 event storm includes a same event that occurs on many systems due to false-alarm. By way of example, such an event can include a misconfiguration, a bad operating system (OS) patch, or an incorrectly defined rule. Learning and prior knowledge are not applicable in such instances because of the difficulty in anticipating and training a system for all types of mistakes that will be made by System Administrators (defining the rules) and OS developers.

An action storm is a special case of a type 1 event storm, and it is defined as events in a set occurring on many systems requiring the same action to be taken. By way of example, an action storm can include the events High_CPU_Overload, High_Memory_Overload, PingFail, etc., being received for a physical machine, which, in a virtualized environment such as a Cloud, may result in the autonomic management system disallowing new virtual machines from being provisioned on that machine until the failure is resolved. Additional examples can include hypervisor_failure, too-manyvnet-_down-event and too-many-bridge_down-events, where the last two "events" indicate the cumulative effect of the autonomic management system maintaining event history. Each of these requires the management system to perform the action of rebooting the system (and provisioning to be stopped until the machine is restarted).

A type 2 event storm includes events in a set that occur on many (often all) systems, indicating a planned or an unplanned outage (the latter indicating a "disaster"). For example, a type 2 event storm can include OS_Agent_Offline, Other_Agent_Offline, and NmosPingFail occurring in some order on many systems. Learning and prior knowledge are applicable because the root causes are few and can be anticipated and a system can be trained to recognize them. The set of events considered in type 1 and type 2 are disjoint.

The following includes definitions of terms used in detection algorithms herein in accordance with at least one embodiment of the invention. A polling cycle, $pc_i$, involves querying an event queue to process the events received to date, which includes failures reported ($e^j_k=1$) as well as failures resolved ($e^j_k=0$). A period of time including n polling cycles is the duration spanning $pc_1, pc_2, \ldots pc_{i-1}, pc_{i+1}, \ldots, pc_n$. An example embodiment of the invention includes defining NumberOfElementsBeingMonitored as the number of IT elements X which are being monitored, each of which can be the subject (or source) of an event.

For each polling cycle i, the following variables are defined. Let $P_{i,j}$ be the set of IT elements X affected due to a factor j (that is, it is a problem), where j=1 ... m. A factor can be a specific event, an event that is a member of a set, or an action. Let $R_{i,j}$ be the set of IT elements X no longer affected due to a factor j (that is, it is resolved), where j=1 ... m. This variable shrinks when an event storm subsides (that is, when the underlying problem is resolved), or when a disruptive action is reversed (for example, server provisioning is enabled again).

Additionally, let $CC_{i,j}$ be a set (as seen during the "current" polling cycle 'i') that keeps track of all of the IT elements affected by an event storm: $CC_{i,j}=CC_{i-1,j} \cup P_{i,j}-R_{i,j}$, where 'U' represents the set union operator, and the size of the set $CC_{i,j}$ represents a sliding window whose size is dynamically computed as described below. The incremental rate of growth, computed during each polling cycle for each (factor-specific) set, is defined as $g_{\Delta i,j}=CC_{i,j}/CC_{i-1,j}$. Let sustained lack of growth be the sequence of $g_{\Delta i,j}$ where every element of the sequence has a value ≤1 and the length of the sequence is dynamically computed.

Additionally, each set $CC_{i,j}$ represents a sliding window of dynamically varying size, which grows when $P_{i,j}>R_{i,j}$ during polling cycle 'i' and shrinks when $P_{i,j}<R_{i,j}$ for factor 'j'.

In a preferred embodiment of the invention, the algorithm maintains one window per factor (event) on which a type 1 event storm can occur, one window per factor (action) on which an action storm can occur, and one window per factor (event that is a member of a set) on which a type 2 event storm can occur.

As detailed herein, an aspect of the invention includes an algorithm to detect a type 1 event storm. As noted, a type 1 event storm is one where the same event occurs on a large number of IT elements over a period of time, where the period of time is n polling cycles and n is determined dynamically. The events considered are disjoint from those considered for type 2 storms, which indicate an outage. Based on the defined terminology herein, the following is an algorithm for real time detection of a type 1 event storm for an event (factor) of type j.

$Growth_\Delta$ can be used to dynamically adjust the size of the (sliding) window, n. As long as $growth_\Delta>1$, increase the window size (n). That is, keep adding nodes reporting events to the set $CC_{i,j}$. The window size n is thus not fixed. If there is a sustained lack of growth, no more events are being reported and the cell has stabilized. Accordingly, check if the type 1 event detection criterion is satisfied. Typically, if it is not an event storm, then individual events can be acted on. Otherwise, take an appropriate action at higher level (cell level). Further, set $CC_{i,j}=\{ \}$ for the start of the next detection cycle.

Event storm detection criterion can include the following. If $CC_{i,j}$/NumberOfElementsBeingMonitored≥$T_j$, then there is an event storm. If threshold $T_j$ is exceeded, then validate the condition with further monitoring/analysis. For example, examine virtual machine (VM) thrashing if a hypervisor thrashing storm is detected on a random sampling of the nodes reporting that event. $T_j$ can be based on experience. Additionally, supervised learning might not be used for Type 1 event storms because of the open-ended nature of the faults (programmer or system administrator-(SA)-induced problems).

As described herein in accordance with at least one embodiment of the invention, an event storm (or an action storm, a special case of an event storm) or an outage in a cloud computing environment is classified either as an event/action storm or an outage based on linear regression techniques. The amount of growth or the slope determined from the linear regression techniques is used to determine the difference between an event/action storm and an outage. A lower bound defining a particular value of the slope is used to characterize an outage. An outage or an event/action storm is determined by comparing a currently measured slope and the lower bound defining an outage. If the measured slope is less than the lower bound for an outage, then occurrence in the cloud system is not an outage, but an event/action storm. Conversely, if the slope is greater than the lower bound for an outage, then the occurrence in the cloud system is an outage, and not an event/action storm.

Figure 1:
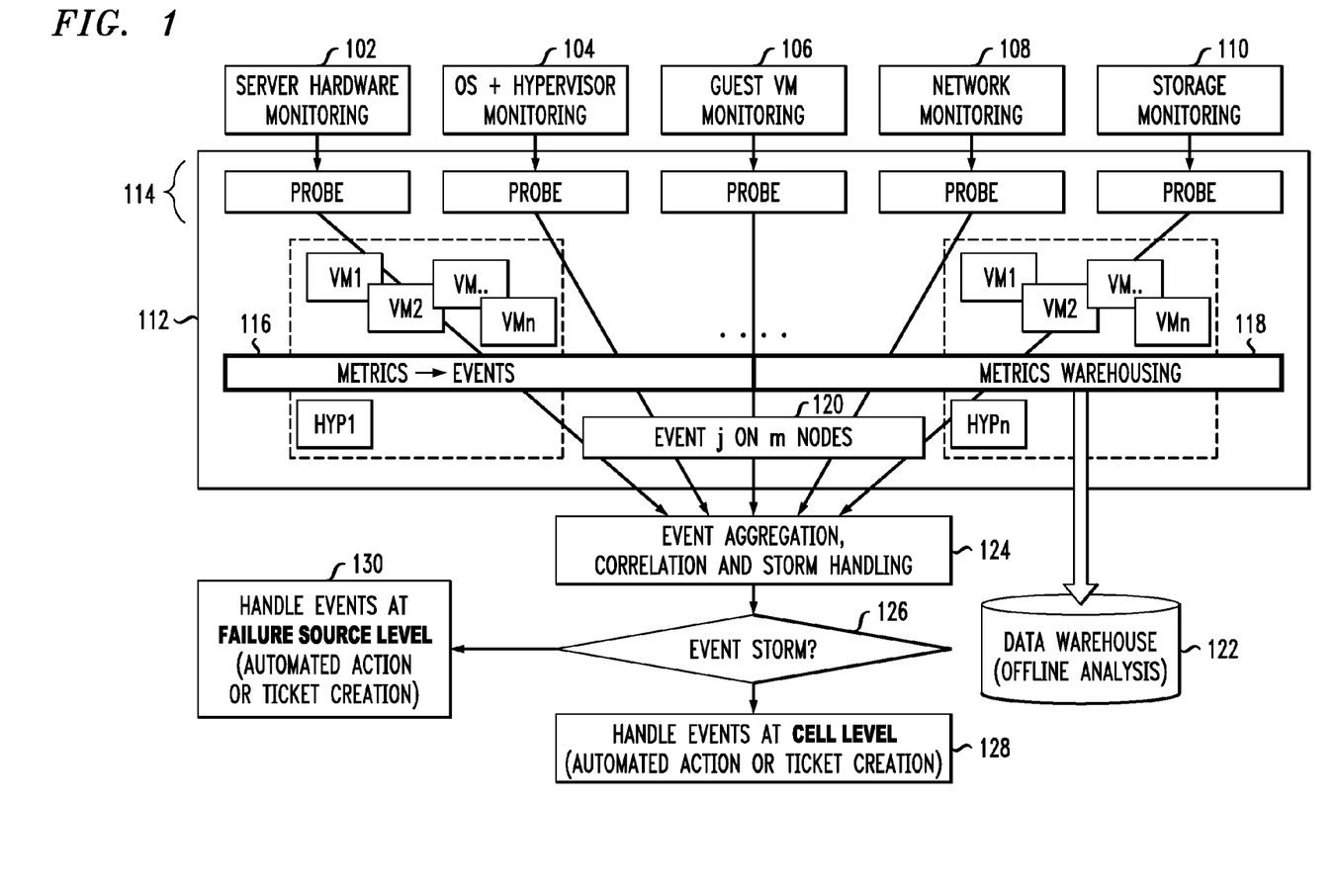
FIG. 1 is a block diagram illustrating an example embodiment of the invention.

FIG. 1 is a diagram illustrating a block diagram illustrating an example embodiment, according to an embodiment of the present invention. By way of illustration, FIG. 1 depicts a server hardware monitoring module 102, an OS and hypervisor monitoring module 104, a guest VM monitoring module 106, a network monitoring module 108 and a storage monitoring module 110, which each provide input to a probe module 114. The probes 114, along with VMs and hypervisors, are part of cell 112, which also includes a module 116 that forwards metrics to events as well as a metrics warehousing module 118. Additionally, in module 116, the metrics are compared against the predefined thresholds; if the threshold is breached, then the event is generated and forwarded to module 124. The warehousing module 118 provides input to a data warehouse 122 (for offline analysis).

As also depicted in FIG. 1, an event j 120 on m nodes is provided, along with input from probes 114, to an event aggregation, correlation and storm handling module 124, which aids in determining whether or not there is an event storm in step 126. If there is not an event storm (or a lack of growth), step 128 includes handling events at a cell level via, for example, automated action or ticket creation. If there is an event storm, step 130 includes handling events at a failure source level via, for example, automated action or ticket creation. Additionally, if there is an event storm, the input can go also be used to determine if the storm is a 'type 1' event storm, an action storm, or a 'type 2' event storm—each leading to a corrective action.

As also described herein, an aspect of the invention includes an algorithm to detect an action storm. An action storm is where a variety of events requiring the same action to be taken occur on a large number of elements over a period of time, where the period of time is n polling cycles. For each event in the event queue, determine action a based on historical data, policy and current state of the system. If action a is considered instead of event j, then the detection algorithm is same as defined for type 1. Supervised learning might not be used for action storms because of the dynamic nature of the policy, history and current state of the system that is used to determine the action.

Figure 2:
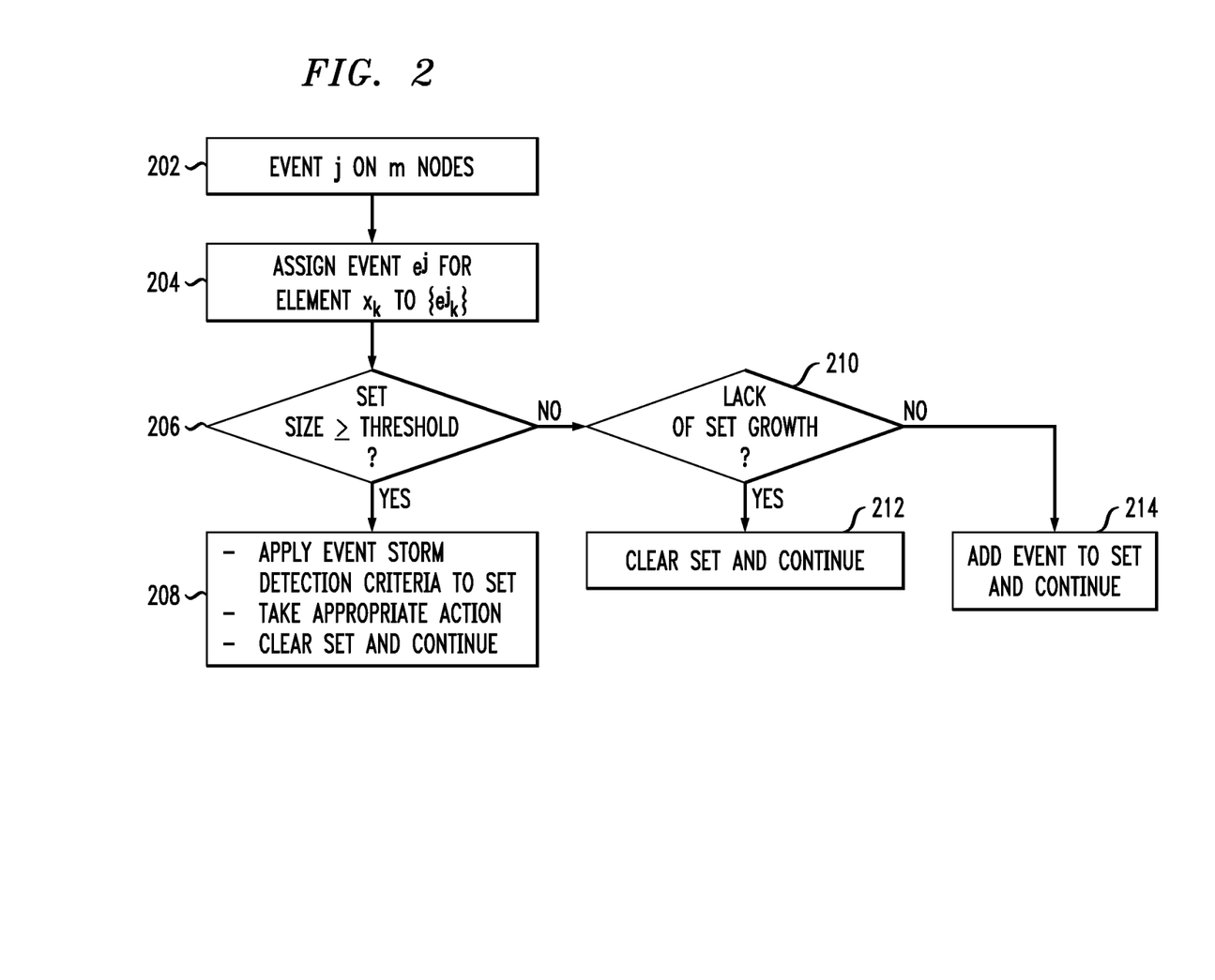
FIG. 2 is a flow diagram illustrating a type 1 event storm, according to an embodiment of the present invention.

FIG. 2 is a flow diagram illustrating a type 1 event storm, according to an embodiment of the present invention. Step 202 includes identifying event j on m nodes. Step 204 includes assigning event $e^j$ for element $x_k$ to $\{e^j_k\}$. Step 206 includes determining if the set size is greater than or equal to a threshold. If yes, step 208 includes applying event storm detection criteria to the set, taking appropriate action, clearing the set and continuing. If no (that is, the set size is not greater than or equal to the threshold), step 210 includes determining if there is a lack of set growth. If yes, step 212 includes clearing the set and continuing. If no, step 214 includes adding the event to the set and continuing.

Figure 3:
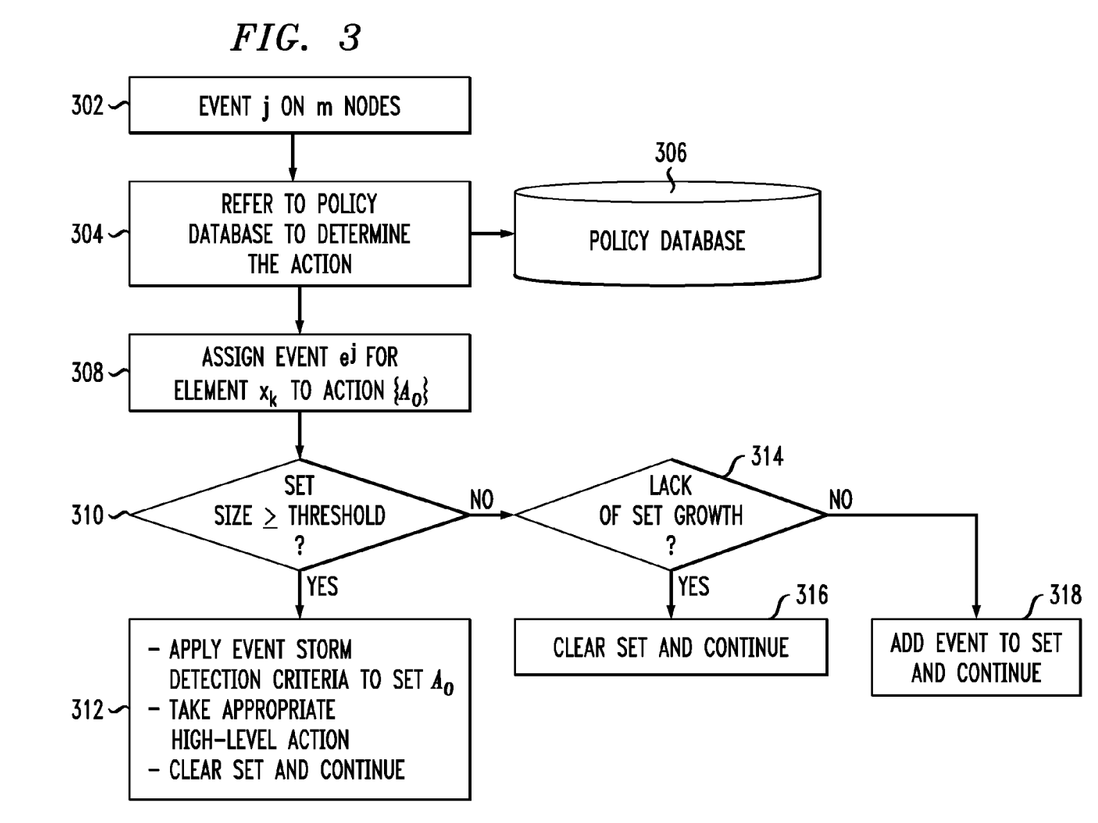
FIG. 3 is a flow diagram illustrating a type 1 action storm, according to an embodiment of the present invention.

FIG. 3 is a flow diagram illustrating a type 1 action storm, according to an embodiment of the present invention. Step 302 includes identifying event j on m nodes. Step 304 includes referring to a policy database 306 to determine the action. Step 308 includes assigning event $e^j$ for element $x_k$ to action $\{A_0\}$. Step 310 includes determining if the set size is greater than or equal to a threshold. If yes, step 312 includes applying event storm detection criteria to the set $A_0$, taking appropriate high-level action, clearing the set and continuing. If no (that is, the set size is not greater than or equal to the threshold), step 314 includes determining if there is a lack of set growth. If yes, step 316 includes clearing the set and continuing. If no, step 318 includes adding the event to the set and continuing.

Additionally, an aspect of the invention includes a circuit breaker (CB). Generally, with a CB implementation, an automatic manager takes a corrective action (for example, a reboot), after processing events in a first in, first out (FIFO) order, until a specified limit is reached—at which time no more corrective actions are taken. The above algorithm is an improvement over a typical circuit breaker because it facilitates the detection of an action storm rather than depending on a predefined threshold on the number of actions taken.

As also detailed herein, another aspect of the invention includes an algorithm to detect a type 2 event storm. A type 2 event storm is one where one of a small set of events occurs on many/all systems, indicating a planned or unplanned failure of an entire cell (that is, a unit of management). Based on defined terminology herein, the following is an algorithm for real-time detection of a type 2 event storm. Let j be an event in a set of events that indicate a machine/element outage. For example, j={OS_AGENT_OFFLINE, OTHER_AGENT_OFFLINE, PINGFAIL}. Compute $CC_{i,j}$ over a window of n events.

$Growth_A$ can be used to dynamically adjust the size of the (sliding) window, n. As long as $growth_A>1$, increase the window size (n). That is, keep adding nodes reporting events to the set $CC_{i,j}$. The window size n is thus not fixed. If there is sustained lack of growth, no more events are being reported that indicates that the cell has stabilized. Additionally, check if the type 2 event detection criterion is satisfied. Typically, if it is not an event storm, then act on individual events per system. Otherwise, take an appropriate action at higher level (cell level). Further, set $CC_{i,j}=\{\ \}$ for the start of the next detection cycle.

An aspect of the invention additionally includes event storm detection criterion. At least one embodiment of the invention includes a linear regression approach, such as the following. Incrementally check the slope based on $growth_A$ computation as long as the value is >1. As long as slope (growth rate) exceeds a low threshold learnt during training for a sufficiently large number of polling cycles (<<NumberOfElementsBeingMonitored), it can be determined that there exists a type 2 event storm.

Figure 4:
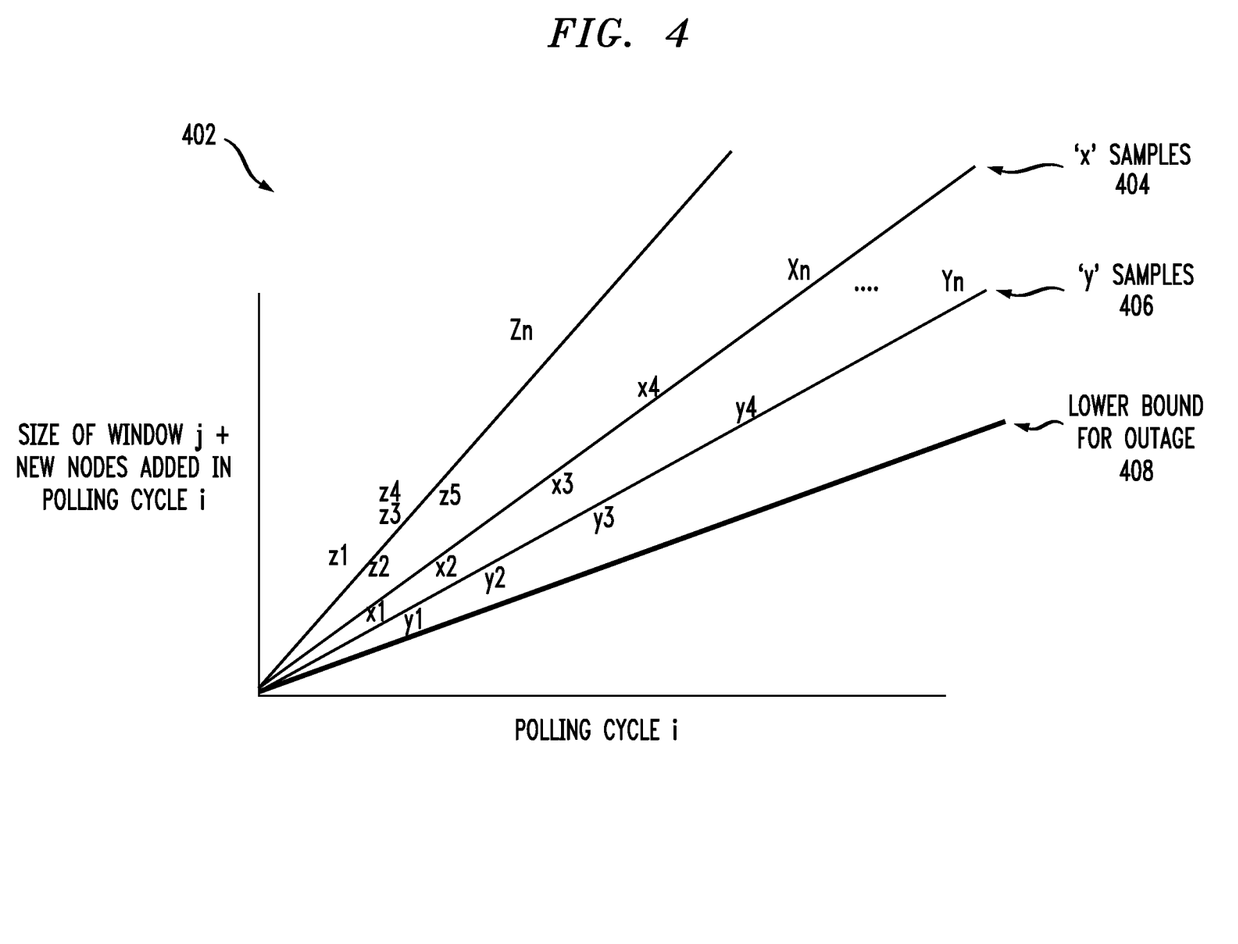
FIG. 4 is a graph illustrating training for planned and unplanned outages using linear regression, according to an embodiment of the present invention.

FIG. 4 is a graph 402 that illustrates samples generated for training a linear regression algorithm for detecting outages (type 2 event storm), according to an embodiment of the present invention. To generate training data, nodes in the cell are shutdown through an automation script, and the outage-related events in the event queue in polling cycle i are processed to identify the nodes that are the source. The X-axis represents the timestamp when the monitoring component reported that a given node N is down. The Y-axis represents the next node that is down. The x samples 404 and y samples 406 represent two different sets of training data generated by two artificially induced cell outages.

If the granularity of the polling interval of the monitoring component is sufficiently fine-grained, the assumption is that the outage data will be approximately linear and a linear regression model can be computed to fit the data. An alternate technique includes fitting the piece-wise linear regression model. By way of example, for description of such a technique, reference can be made Castelli et al., "Proactive Management of Software Aging," IBM J. Res. & Dev., Vol. 45, No. 2, March 2001.

Based on the trained model, a lower bound slope for an outage 408 can be derived to determine whether an outage is occurring based on the rate of type 2 events received by the autonomic management system during a set of polls. This model-based approach allows detection of an outage without requiring all outage events to be received. Such outage events can number in thousands in a large cell and can also require event delivery be completely error-free (that is, no events are lost).

Figure 5:
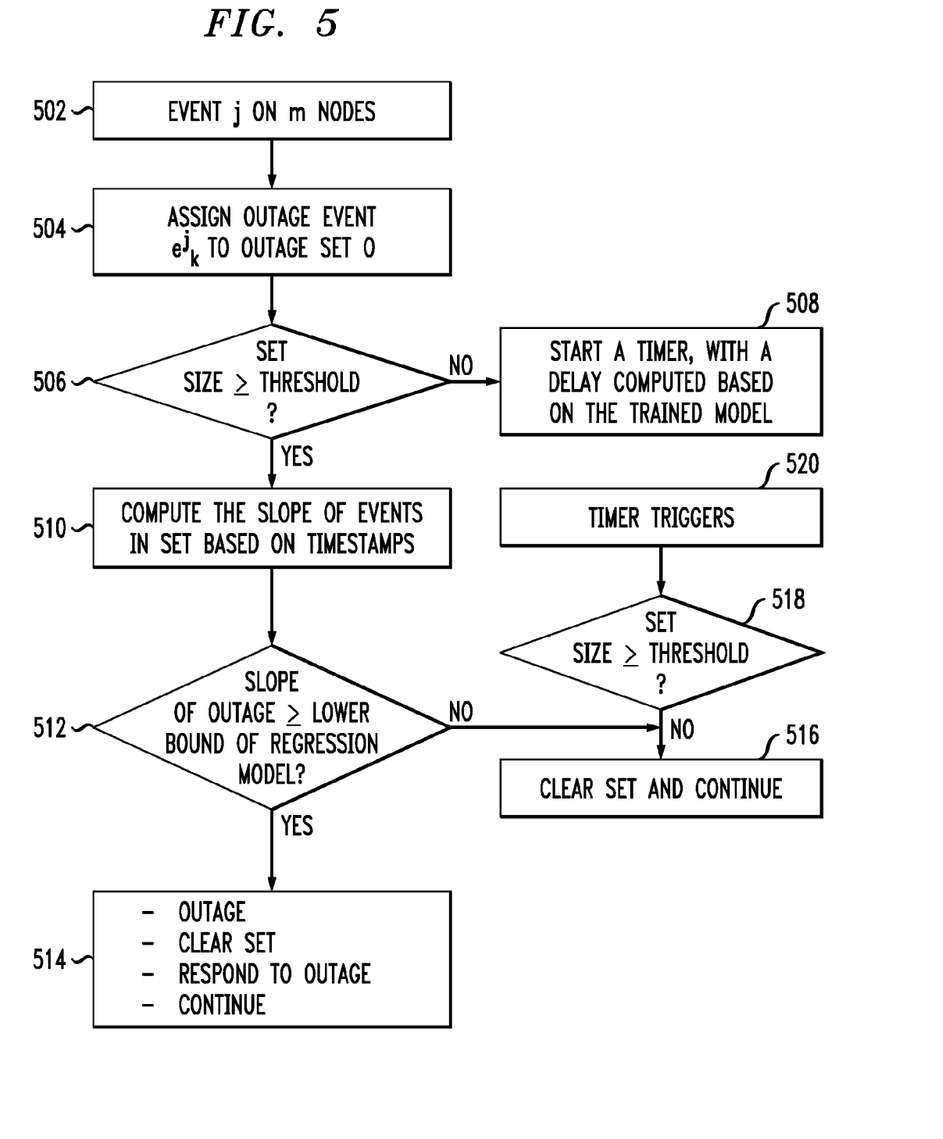
FIG. 5 is a flow diagram illustrating a type 2 event storm based on regression, according to an embodiment of the present invention.

FIG. 5 is a flow diagram illustrating a type 2 event storm based on regression, according to an embodiment of the present invention. Step 502 includes identifying event j on m nodes. Step 504 includes assigning outage event $e^j_k$ to outage set O. Step 506 includes determining if the set size is greater than or equal to a threshold. If no, step 508 includes starting a timer, with a delay computed based on the trained model. If yes, step 510 includes computing the slope of events in the set based on timestamps.

Additionally, step 512 includes determining if the slope of outage is greater than or equal to the lower bound of a regression model. If yes, step 514 includes clearing the set, responding to the outage and continuing. If no, step 516 includes clearing the set and continuing. Also, step 520 includes providing timer triggers and step 518 includes determining if the set size is greater than or equal to a threshold. If no, proceed to step 516.

Figure 6:
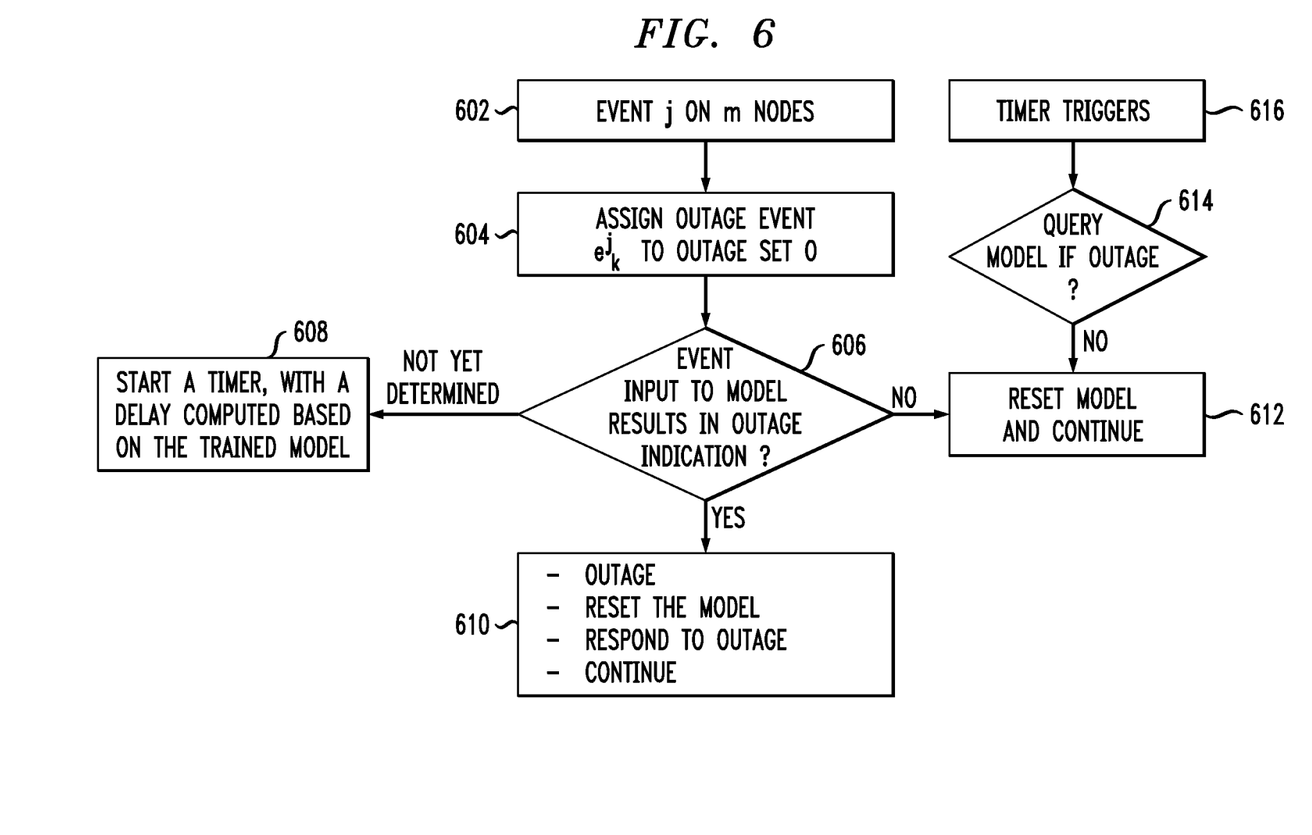
FIG. 6 is a flow diagram illustrating a type 2 event storm based on stochastic modeling, according to an embodiment of the present invention.

FIG. 6 is a flow diagram illustrating a type 2 event storm based on stochastic modeling, according to an embodiment of the present invention. Step 602 includes identifying event j on m nodes. Step 604 includes assigning outage event $e^j_k$ to outage set O. Step 606 includes determining if the event input to the model results in an outage indication. If not yet determined, step 608 includes starting a timer, with a delay computed based on the trained model. If yes (that is, the event input to the model results in an outage indication), step 610 includes resetting the model, responding to the outage and continuing. If no (that is, the event input to the model does not result in an outage indication), step 612 includes resetting the model and continuing.

Also, step 616 includes providing timer triggers and step 614 includes determining if the query model is used in connection with an outage. If no, proceed to step 612.

Another aspect of the invention includes other machine learning approaches to predict a type 2 event storm. To predict the distribution of events over various polling cycles, stochastic modeling can be used to estimate the probability distribution of potential outcomes by allowing random variation of event occurrence over various polling cycles. Distributions of potential outcomes are derived from a large number of simulations (stochastic modeling) which reflect the random variation in the input, that is, event storm occurrence over various polling cycles. For example, a Hidden Markov Model (HMM) can be created (trained) to detect an outage based on analyzing a small subset of outage events that are tagged by outage timestamps.

Figure 7:
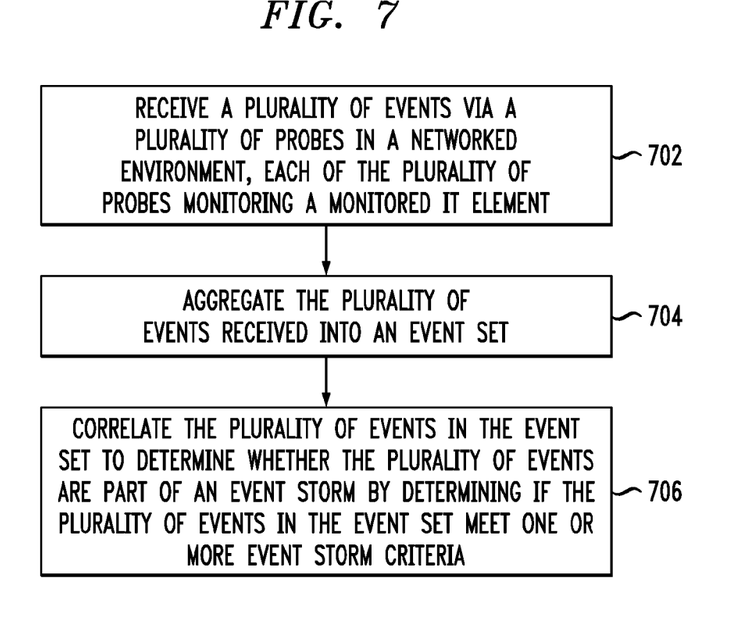
FIG. 7 is a flow diagram illustrating techniques for detecting an event storm in a networked environment, according to an embodiment of the invention.

FIG. 7 is a flow diagram illustrating techniques for detecting an event storm in a networked environment, according to an embodiment of the present invention. Step 702 includes receiving a plurality of events via a plurality of probes (for example, a monitoring component, as also used herein) in a networked environment, each of the plurality of probes monitoring a monitored IT element. A monitored IT element can include, for example, one or more virtual machine memories, one or more virtual central processing units, one or more hypervisors, server hardware, an operating system, and storage. Step 704 includes aggregating the plurality of events received into an event set.

Step 706 includes correlating the plurality of events in the event set to determine whether the plurality of events are part of an event storm by determining if the plurality of events in the event set meet one or more event storm criteria. Correlating the plurality of events in the event set to determine whether the plurality of events is part of an event storm can include using a linear regression technique. An example embodiment of the invention can also include determining an amount of growth determined from the linear or piece-wise regression technique, and using the determined amount of growth to determine a difference between a potential event storm and an outage by comparing a lower bound defining a particular value characterizing an outage with a measured growth.

As detailed herein, event sets can include, for example, an event set for a type 1 event storm, an event set of each action type, an event set for outage, etc. Each event set represents a type of event storm, wherein some sets have a higher weight than others. For example, an outage event set has higher priority as compared to some other event sets.

An event storm can include one of a type 1 event storm, an action storm and a type 2 event storm. As described herein, a type 1 event storm includes a same event that occurs on multiple system elements over a period of time, wherein the period of time is n polling cycles. Also, an action storm is a case of a type 1 event storm wherein events in a set occurring on multiple system elements require a same action to be taken over a period of time, where the period of time is n polling cycles. Further, a type 2 event storm includes multiple events in an event set that occur on multiple system elements, indicating a planned or an unplanned outage.

The techniques depicted in FIG. 7 can additionally include taking a single corrective action to respond to the plurality of events in the event set corresponding to each event storm. The corrective action can include a non-response, a provision for more system or computing resources, and/or creating a ticket. Such actions can be disruptive or non-disruptive, where a disruptive action may be disruptive to the system or service (such as reboot/shutdown or stop of provisioning), and a non-disruptive action can include actions such as adding more system/computing resources or creating a ticket. Also, the techniques depicted in FIG. 7 can include using machine learning to predict an event storm. Using machine learning to predict an event storm includes using stochastic modeling to estimate a probability distribution of one or more potential outcomes by allowing random variation of event occurrence over multiple polling cycles, wherein the random variation is based on fluctuations observed in historical data for a selected period, and wherein the probability distribution of one or more potential outcomes are derived from multiple simulations which reflect the random variation as an input.

The techniques depicted in FIG. 7 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 8:
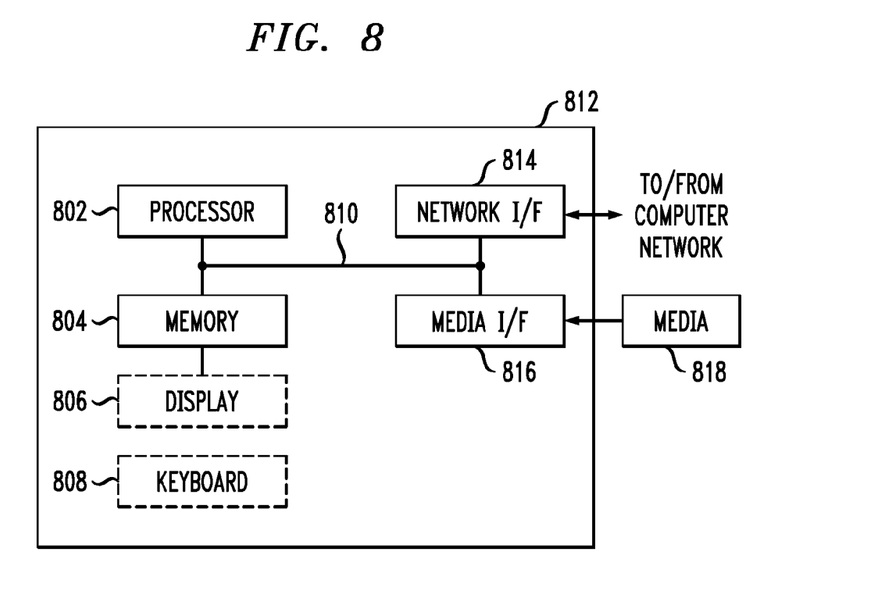
FIG. 8 is a system diagram of an exemplary computer system on which at least one embodiment of the invention can be implemented.

Additionally, an aspect of the present invention can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, detecting an event storm in a cloud environment in real-time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting an event storm in a networked environment, wherein the method comprises:
    receiving a plurality of events via a plurality of probes in a networked environment, each of the plurality of probes monitoring a monitored information technology (IT) element;
    aggregating the plurality of events received into an event set; and
    correlating the plurality of events in the event set via a linear regression technique to determine whether the plurality of events are part of an event storm by determining if the plurality of events in the event set meet one or more event storm criteria via:
        using a determined amount of growth from the linear regression technique to determine a difference between a potential event storm and an outage by comparing a lower bound defining a particular value characterizing an outage with a measured growth;
    wherein at least one of the steps is carried out by a computer device.

2. The method of claim 1, further comprising:
    taking a single corrective action to respond to the plurality of events in the event set corresponding to the event storm.

3. The method of claim 2, wherein the single corrective action comprises one or more of a provision for more system or computing resources, and creating a ticket.

4. The method of claim 1, wherein a monitored IT element comprises one of one or more virtual machine memories, one or more virtual central processing units, one or more hypervisors, server hardware, an operating system and storage.

5. The method of claim 1, wherein an event storm comprises one of a type 1 event storm, an action storm and a type 2 event storm.

6. The method of claim 5, wherein the event storm comprises a type 1 event storm, and wherein a type 1 event storm includes a same event that occurs on multiple system elements over a period of time, wherein the period of time is n polling cycles.

7. The method of claim 5, wherein an action storm is a case of a type 1 event storm wherein events in a set occurring on multiple system elements require a same action to be taken over a period of time, where the period of time is n polling cycles.

8. The method of claim 5, wherein a type 2 event storm includes multiple events in an event set that occur on multiple system elements, indicating a planned or an unplanned outage.

9. The method of claim 1, further comprising:
using machine learning to predict an event storm.

10. The method of claim 9, wherein using machine learning to predict an event storm comprises:
using stochastic modeling to estimate a probability distribution of one or more potential outcomes by allowing random variation of event occurrence over multiple polling cycles,
wherein the random variation is based on fluctuations observed in historical data for a selected period, and
wherein the probability distribution of one or more potential outcomes are derived from multiple simulations which reflect the random variation as an input.

11. An article of manufacture comprising a computer readable storage medium having computer readable instructions tangibly embodied thereon which, when implemented, cause a computer to carry out a plurality of method steps comprising:
receiving a plurality of events via a plurality of probes in a networked environment, each of the plurality of probes monitoring a monitored IT element;
aggregating the plurality of events received into an event set; and
correlating the plurality of events in the event set via a linear regression technique to determine whether the plurality of events are part of an event storm by determining if the plurality of events in the event set meet one or more event storm criteria via:
using a determined amount of growth from the linear regression technique to determine a difference between a potential event storm and an outage by comparing a lower bound defining a particular value characterizing an outage with a measured growth.

12. The article of manufacture of claim 11, wherein the computer readable instructions which, when implemented, further cause a computer to carry out a method step comprising:
taking a single corrective action to respond to the plurality of events in the event set corresponding to the event storm.

13. The article of manufacture of claim 11, wherein a monitored IT element comprises one of one or more virtual machine memories, one or more virtual central processing units, one or more hypervisors, server hardware, an operating system and storage.

14. The article of manufacture of claim 11, wherein an event storm comprises one of a type 1 event storm, an action storm and a type 2 event storm.

15. A system for detecting an event storm in a networked environment, comprising:
at least one distinct software module, each distinct software module being embodied on a tangible computer-readable medium;
a memory; and
at least one processor coupled to the memory and operative for:
receiving a plurality of events via a plurality of probes in a networked environment, each of the plurality of probes monitoring a monitored IT element;
aggregating the plurality of events received into an event set; and
correlating the plurality of events in the event set via a linear regression technique to determine whether the plurality of events are part of an event storm by determining if the plurality of events in the event set meet one or more event storm criteria via:
using a determined amount of growth from the linear regression technique to determine a difference between a potential event storm and an outage by comparing a lower bound defining a particular value characterizing an outage with a measured growth.

16. The system of claim 15, wherein the at least one processor coupled to the memory is further operative for:
taking a single corrective action to respond to the plurality of events in the event set corresponding to the event storm.

17. The system of claim 15, wherein a monitored IT element comprises one of one or more virtual machine memories, one or more virtual central processing units, one or more hypervisors, server hardware, an operating system and storage.

18. The system of claim 15, wherein an event storm comprises one of a type 1 event storm, an action storm and a type 2 event storm.

* * * * *